United States Patent Office 2,830,095
Patented Apr. 8, 1958

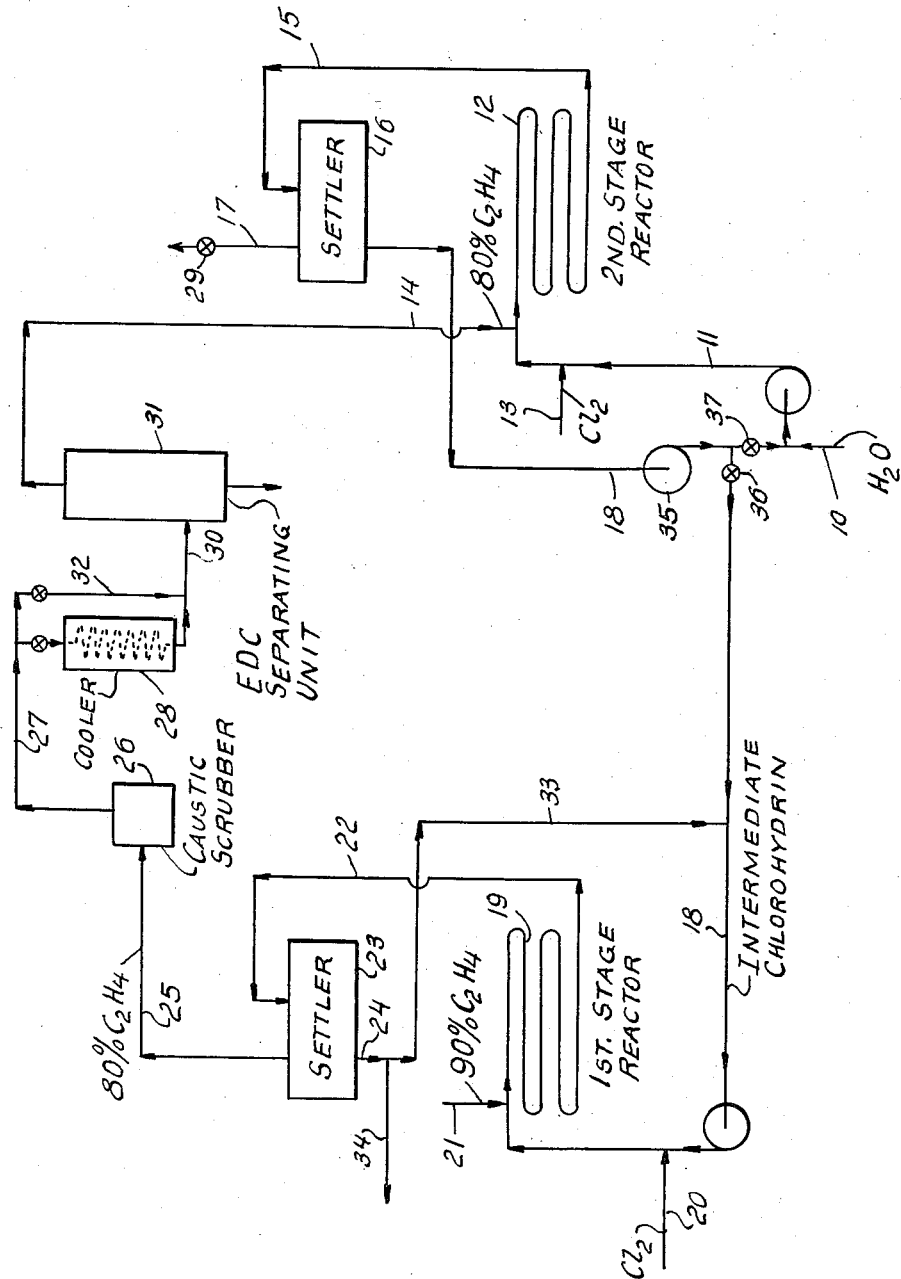

2,830,095

PRODUCTION OF ETHYLENE CHLOROHYDRIN

Bernard H. Nicolaisen, Kenmore, N. Y., assignor to Olin Mathieson Chemical Corporation, a corporation of Virginia Application May 7, 1953, Serial No. 353,658

8 Claims. (Cl. 260—634)

This invention relates to the production of olefin chlorohydrins, especially ethylene chlorohydrin. More particularly it relates to improvements in the yield of product by control of the concentration of by-product olefin dichloride in the reaction liquor.

Prior processes of producing ethylene chlorohydrin usually comprise introducing a stream of olefin-bearing gas and a stream of chlorine separately into a body of water in a suitable reactor. In general, the stream of ethylene is diluted with saturated hydrocarbons such as methane or other inert gases, the mixed gas containing up to about 40 mole percent of ethylene. A suitable proportion of chlorine to react with the ethylene contained in the gas and to produce a chlorohydrin solution of about 6 percent concentration is introduced. Extensive operations of distillation or extraction are necessary in order to obtain relatively concentrated solutions of ethylene chlorohydrin or pure anhydrous ethylene chlorohydrin. Ethylene dichloride, always formed in the reaction mixture as a by-product, usually forms a separate phase dispersed in the aqueous reaction medium.

Whenever an attempt is made to use a relatively concentrated ethylene gas containing, for example, 50 mole percent or more of ethylene or to reduce the proportion of water introduced, or to recycle the aqueous liquor in an effort to obtain chlorohydrin solutions of greater concentrations, numerous difficulties are encountered. The proportion of ethylene dichloride formed usually increases and its presence appears to favor the formation of additional quantities. Concomitantly, the chlorohydrin yield decreases.

My process permits manufacture of relatively concentrated chlorohydrin solutions of up to 12 percent or more using rich ethylene gas as feed. Yields are 80 percent or more and conversions are high by carefully restricting formation and concentration of ethylene dichloride. As a result, the size of the necessary equipment, and accordingly the expense, is considerably reduced.

The chlorohydrination reaction is carried out in a plurality of stages arranged at least partly in series. Water is introduced into the last stage reactor and flows counter-stage to the rich ethylene gas introduced to the first stage reactor. The reactors are advantageously tubular in character and the gases dissolve and react in the flowing stream of water. Ethylene dichloride is effectively scrubbed from the reaction liquor in the reactors by the gas stream which is treated between stages to remove ethylene dichloride. Also the effluent liquor from the first stage is advantageously treated to remove residual ethylene dichloride and then may be utilized as such or may be treated for recovery of concentrated ethylene chlorohydrin. Additional chlorine is introduced as the reaction liquor enters the next stage.

Ethylene dichloride may be removed from the gas stream by physical or physico-chemical methods. For example, the gas stream may be refrigerated to cause separation of ethylene dichloride. Treatment by absorption or adsorption, however, with or without cooling, is better. Thus, an oil scrubber may be used or a passage over activated carbon or other adsorbents is advantageous.

The yield of ethylene chlorohydrin, I have found, depends directly on the ethylene dichloride content of the reaction liquor. By this I mean not merely separate phase ethylene dichloride but more important dissolved ethylene dichloride. The content of ethylene dichloride in turn is dependent on the purity of the ethylene charged and the extent of dilution with other gases, the chlorohydrin concentration, the reactor pressure and temperature and the extent to which ethylene dichloride is removed from the gas between stages. Primarily all of these factors but the last are pre-established by economic and design consideration based upon the nature of the hydrocarbon feed gas available, the feed-fractionation facilities and the process design. I have found however that multi-stage reaction with interstage removal of ethylene dichloride from the gas stream effectively reduces the ethylene dichloride concentration in the reaction liquor. Removal of ethylene dichloride from the gas stream, moreover, is directly dependent upon conditions of temperature and pressure in the interstage treating zone. Reduced temperature benefits the removal treatment, but also reduced pressure in the reaction zone is beneficial in ethylene dichloride removal. The effect of the interstage treatment is to reduce the ethylene dichloride content of the gas and therefore of the liquor. Maintenance of the ethylene dichloride content of the reaction liquor at less than about 0.35 weight percent is essential in order to obtain yields of over 90 percent. Thus with interstage treatment by temperature reduction to less than about 20° C. and pressure control at about 20–35 p. s. i. g., or with mechanical or chemical removal by absorption or adsorption, the ethylene dichloride content of the reaction liquor is maintained below 0.35 percent and yields of better than 90 percent are obtained consistently.

To obtain the advantages of the process it is desirable to control reactor pressure from about 10 to about 100 p. s. i. g. Using a tubular reactor, the tube diameter may vary from about 1.5 to 4 inches in diameter. Although larger tubes can be used, they are more expensive than is usually justifiable. A suitable velocity of flow of the reaction liquor in the tubes is about 3 to 7 feet per second. Alternatively, conventional tank type reactors may be used in series. The feed gas may contain from about 50 to 95 mole percent of ethylene. Reactor temperatures may vary from about 25 to 80° C. A minimum of two reaction stages should be used.

To obtain yields of 90–95 percent of ethylene chlorohydrin it is desirable to maintain these variables within these limits. Special advantages however can be realized when the feed gas contains about 80–90 mole percent of ethylene and the gas is introduced at a pressure of 35 to 45 p. s. i. g. to the first of two reactors arranged in series. The aqueous liquor then may flow through the tubes at about 5 feet per second with tubes of about 4 inches in diameter. Under these conditions with an interstage gas cooler operating at 25–35 p. s. i. g. and at a temperature of 0–20° C., the ethylene dichloride content of the reactor liquor is maintained below about 0.35 percent and yields of over 90 percent may be consistently obtained. Under closely controlled conditions of operation, yields of about 97 percent of ethylene chlorohydrin may be obtained by maintaining an ethylene dichloride concentration in the reactor liquor below about 0.08 percent.

When the ethylene dichloride content is reduced by cooling or scrubbing the reactor gas between stages, the ultimate yield of ethylene chlorohydrin may be expressed as a function of the pressure and temperature of the interstage ethylene dichloride removal operation, provided other factors, e. g. ethylene concentration and chlorohydrin concentration, are fixed. By way of example, using a reactor temperature of about 132° F., an inlet gas containing about 90 percent ethylene (dry basis) and an effluent gas from the second stage reactor containing about 50 percent ethylene (dry basis), test data show that yields approximating 90–95 percent of chlorohydrin may be obtained by operating an interstage cooler at about 25–40 p. s. i. g. and between 0 and 30° C. In addition, significantly higher yields are obtained by interstage absorption or adsorption as compared to the use of the cooler alone. Absorption or adsorption is particularly advantageous in that ethylene dichloride may be more effectively removed without the necessity of reducing the temperature of the stream.

As shown in the flow plan of the accompanying drawing water is pumped by lines 10 and 11 through tubular reactor 12. Chlorine is injected through connection 13 and approximately 80 percent ethylene gas stream from the first stage is injected from line 14. The reaction mixture is discharged from second stage reactor 12 through line 15 into a settler 16. Spent gas is removed from settler 16 by line 17 controlled by valve 29 which maintains the operating pressure on the system. The reaction liquor is pumped by means of pump 35 in line 18 and the effluent is divided between valved lines 18 and 11 to control the proportion of liquor recycled to the second stage reactor and charged to the first stage reactor 19. Chlorine is injected by means of connection 20 and approximately 90 percent feed gas is injected by means of connection 21. The effluent from first stage reactor 19 is discharged through line 22 into a settler 23. The reaction liquor is withdrawn through line 24 and may be partly recycled through line 33 and wholly or partly removed as product through line 34. The first stage effluent gas is passed by line 25 to caustic scrubber 26 and thence by line 27 through cooler 28 and line 30 discharging into the ethylene dichloride separating unit 31. The temperature of the gas stream may be controlled by passing all or a portion of the stream through valved bypass line 32 or through refrigeration cooling section 28. The ethylene dichloride separating unit is diagrammatically shown and may represent the knock-out drum following the refrigeration equipment or it may represent a tower packed with an adsorbent material such as activated charcoal, silica gel, alumina and the like. Alternatively, ethylene dichloride separating unit 31 may represent an absorption system in which the entering gas stream is scrubbed by countercurrent flow through a packed tower through which a solvent for ethylene dichloride is introduced. Advantageously, a petroleum solvent of the aliphatic type may be employed.

*Example I*

During a run of about 3 hours, 73.9 pounds of ethylene diluted with 16.6 pounds of nitrogen to give a mixture containing 79.3 moles percent of ethylene was introduced into a flowing stream of aqueous liquor in a tubular reactor system. During the run 3843 pounds of water was introduced and continuously recycled at a superficial liquid velocity of 5 feet per second through the reactor. Chlorine was introduced at a point upstream from the ethylene inlet. The reactor temperature was 44° C. and the pressure was 48.6 p. s. i. g. In the interstage cooler a temperature of 26° C. was maintained and the pressure was 37.6 p. s. i. g. Ethylene dichloride concentration in the circulating liquor averaged 0.06% and the total formed was 3.7 pounds. The weight and yield of ethylene chlorohydrin were about 160 pounds and 97.4%, respectively.

*Example II*

A mixture of about 160 pounds of ethylene and 35.8 pounds of nitrogen was introduced into the tubular reactor of Example I with 9025 pounds of water. The superficial liquid velocity was 5 feet per second. Chlorine was introduced as before and the reactor was maintained at about 54° C. The interstage cooler was operated at 19.3° C. and at 38 p. s. i. g. to maintain an ethylene dichloride concentration in the liquor of 0.07%. The weight of ethylene dichloride formed was 3.58 pounds. Ethylene chlorohydrin yield was 97.8% and the ethylene conversion was 94.1%.

*Example III*

A gas mixture simulating that obtainable from such a scrubber operation as described in Example II and comprising 122 pounds of ethylene and 3.96 pounds of ethylene dichloride was diluted with 26.4 pounds of nitrogen and charged to a similar reactor system with 1199 pounds of water. Chlorine was introduced as before. The ethylene dichloride content of the reaction liquor was 0.18% and the ethylene chlorohydrin yield was 93%.

I claim:

1. In the production of ethylene chlorohydrin by chlorohydrination of ethylene in an aqueous system, the method which comprises conducting the reaction in a plurality of serially connected gas-liquid reaction stages including a first stage and a second stage, ethylene gas and liquid flowing countercurrently between the stages, ethylene gas passing from the first stage to the second stage and liquid passing from the second stage to the first stage, controlling the concentration of ethylene in the feed gas at 50–95 mole percent, the reaction temperature between about 25–80° C. and the reaction pressure between about 10 to 100 p. s. i. g., removing the ethylene gas stream between the stages, treating it for removal of ethylene dichloride, and injecting the treated gas into the second stage whereby the treated gas scrubs ethylene dichloride from the reaction liquor in the second stage thereby providing desirable reaction conditions in the second stage and conditioning the reaction liquor for use in the first stage.

2. In the production of ethylene chlorohydrin by chlorohydrination of ethylene in an aqueous system, the method which comprises conducting the reaction in a plurality of serially connected gas-liquid reaction stages including a first stage and a second stage, ethylene gas and liquid flowing countercurrently between the stages, ethylene gas passing from the first stage to the second stage and liquid passing from the second stage to the first stage, controlling the concentration of ethylene in the feed gas at 50–95 mole percent, the reaction temperature between about 25–80° C. and the reaction pressure between about 10 to 100 p. s. i. g., removing the ethylene gas stream between the stages, treating it for removal of ethylene dichloride, and injecting the treated gas into the second stage whereby the treated gas scrubs ethylene dichloride from the reaction liquor in the second stage thereby providing desirable reaction conditions in the second stage and conditioning the reaction liquor for use in the first stage, the extent of ethylene dichloride removal being controlled to maintain less than about 0.35% by weight ethylene dichloride in the first and second stage reaction liquor.

3. The process of claim 2 in which the extent of any stage ethylene dichloride removal is controlled to maintain less than about 0.08% ethylene dichloride in the reaction liquor.

4. The process of claim 2 in which the treatment for ethylene dichloride removal is conducted by cooling the gas stream while maintaining a pressure less than the reaction pressure.

5. The process of claim 2 in which the treatment for ethylene dichloride removal is conducted by contacting the gas stream with a solid absorbent.

6. The process of claim 2 in which the treatment for ethylene dichloride removal is conducted by contacting the gas stream with an absorbent medium.

7. The process of claim 2 in which the treatment of ethylene dichloride removal is conducted by contacting the gas stream with an aliphatic type petroleum solvent.

8. The process of claim 2 in which the treatment for ethylene dichloride removal is conducted by cooling the reaction gas stream to less than about 20° C. while maintaining a pressure of about 20 to 35 p. s. i. g.

References Cited in the file of this patent

UNITED STATES PATENTS

| | | |
|---|---|---|
| 1,456,959 | Young | May 29, 1923 |
| 2,265,793 | Archibald | Dec. 9, 1941 |
| 2,566,355 | Neuhaus | Sept. 4, 1951 |
| 2,769,845 | Knaus | Nov. 6, 1956 |